Dec. 25, 1945.  C. C. CLARK  2,391,771
TIME SCHEDULE CALCULATOR
Filed April 17, 1943  2 Sheets-Sheet 1
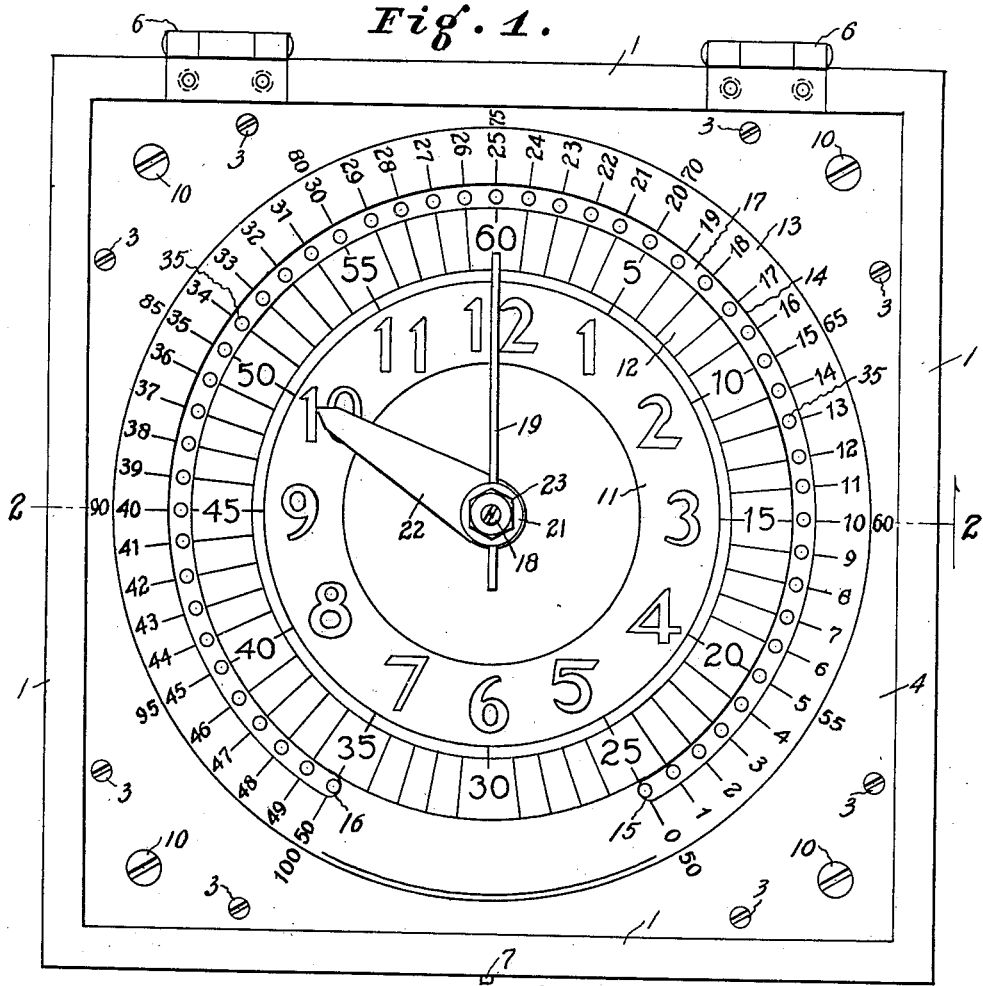
Fig. 1.
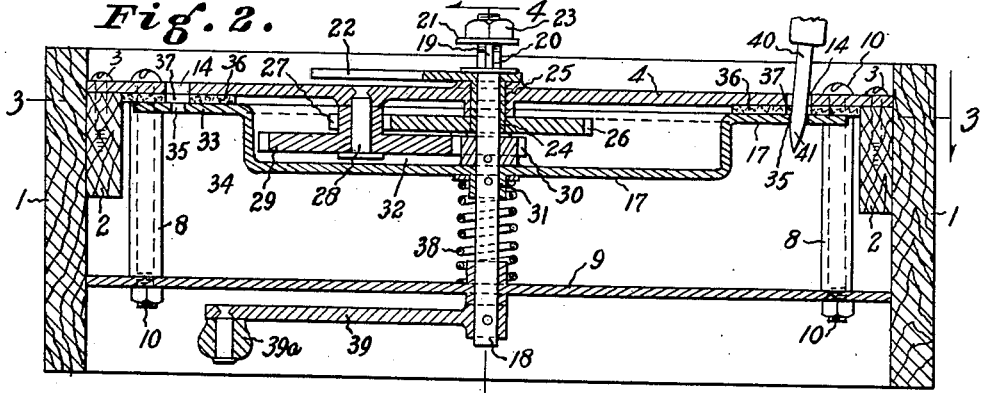
Fig. 2.
INVENTOR.
CHARLES C. CLARK
BY
ATTORNEY.

Dec. 25, 1945.  C. C. CLARK  2,391,771
TIME SCHEDULE CALCULATOR
Filed April 17, 1943  2 Sheets-Sheet 2

INVENTOR.
CHARLES C. CLARK
BY
ATTORNEY.

UNITED STATES PATENT OFFICE 2,391,771

TIME SCHEDULE CALCULATOR

Charles C. Clark, Columbus, Ohio

Application April 17, 1943, Serial No. 483,525

6 Claims. (Cl. 235—83)

This invention relates to a device for quickly and conveniently computing or totaling the time required, from any fixed starting time to the ending time, for showing two or more time ranges or schedules, such as for example the showing of films in movie houses or other places where reel films are to be shown or different items or topics of a program are to be given within a specified time schedule or period.

The device is provided with a clock dial having the hour and minute scale graduated thereon and indicated by hour and minute hands. There is also on the dial another graduated minute scale with any desired minutes indicated and arranged in sequence counter-clockwise of the dial. This scale may, for convenience, be referred to as the dialing or counter-clockwise minute scale. The dialing minute scale may advantageously be single or plural in any desired range or ranges, from 0 to the desired maximum in each scale, and as such is one of the single scales selectively used. For example, one scale may advantageously be in a range from 0 to 50 in devices which are used with short film reels, whereas in movie houses, which use long and short reel films, the dialing minute scale can advantageously be higher, preferably 0 to 100. A plural dialing minute scale may be set out in contrast, as by contrasting colors or the like. Or the multi-scales may be numbered in sequence for form in range cycles. For example, one scale may be numbered from 0 to 50 and the other from 50 to 100. If a number exceeding 50 and not exceeding 100 is to be dialed, then the dialing scale will first be manipulated in the lower scale from 50 to 0 and then in the higher scale from the desired number to 50. For example, if the number 76 were to be dialed, the dial would first be turned to 0 from 50, one whole cycle, and then from 76 to 50, making the total 76.

Adjacent the minute scale there is a movable dial, for convenience called the dialing disc. The dial is provided with the dialing minute scale, and any minute time periods may be selected and the dialing disc turned clockwise therefrom to 0 in order that the clock hands may be moved to indicate the schedule period or periods which have been dialed and calculated.

For example, assuming that a moving picture schedule was to start at ten o'clock, the clock hand would be set to that time. One film to be shown requires ten minutes for showing; a second film requires forty minutes; and a third film requires one hundred and twenty minutes. The dialing disc is first actuated clockwise on the dialing minute scale from 10 to 0 and thereby moves the clock hands ten minutes for the ten minute film. The dialing disc is then actuated clockwise on the minute scale from 40 to 0 and thereby advances the clock hands forty minutes more to make a total of fifty minutes. The dialing disc is a third time actuated clockwise on the dialing minute scale from 50 to 0, again from 50 to 0, and again from 20 to 0 (120 minutes); thereby further advancing the clock hands one hundred and twenty minutes more. The time required for showing the three films is one hundred and seventy minutes or two hours and fifty minutes, and the clock wil show immediately that the showing will be completed at 12:50 o'clock from the 10 o'clock starting time. Thus, the length of time for showing the film reels as well as the finishing time is quickly and accurately given.

Any suitable means for actuating the dialing disc may be employed, such as spaced apart recesses which may be conveniently engaged by a peg inserted therein. The peg may be a separate element or attached in some way to the machine.

Other means may also be provided for quickly manipulating the clock hands to any desired hour or time from which the schedule is to be computed. This may be a crank or handle at the back or on the face of the clock and connected to the hands.

For a better understanding of the invention, reference is made to the accompanying drawings, in which Fig. 1 is a plan view of a device embodying the invention, fitted within a frame in which the cover is removed;

Fig. 2 is a vertical cross section on line 2—2 of Fig. 1;

Figure 3:
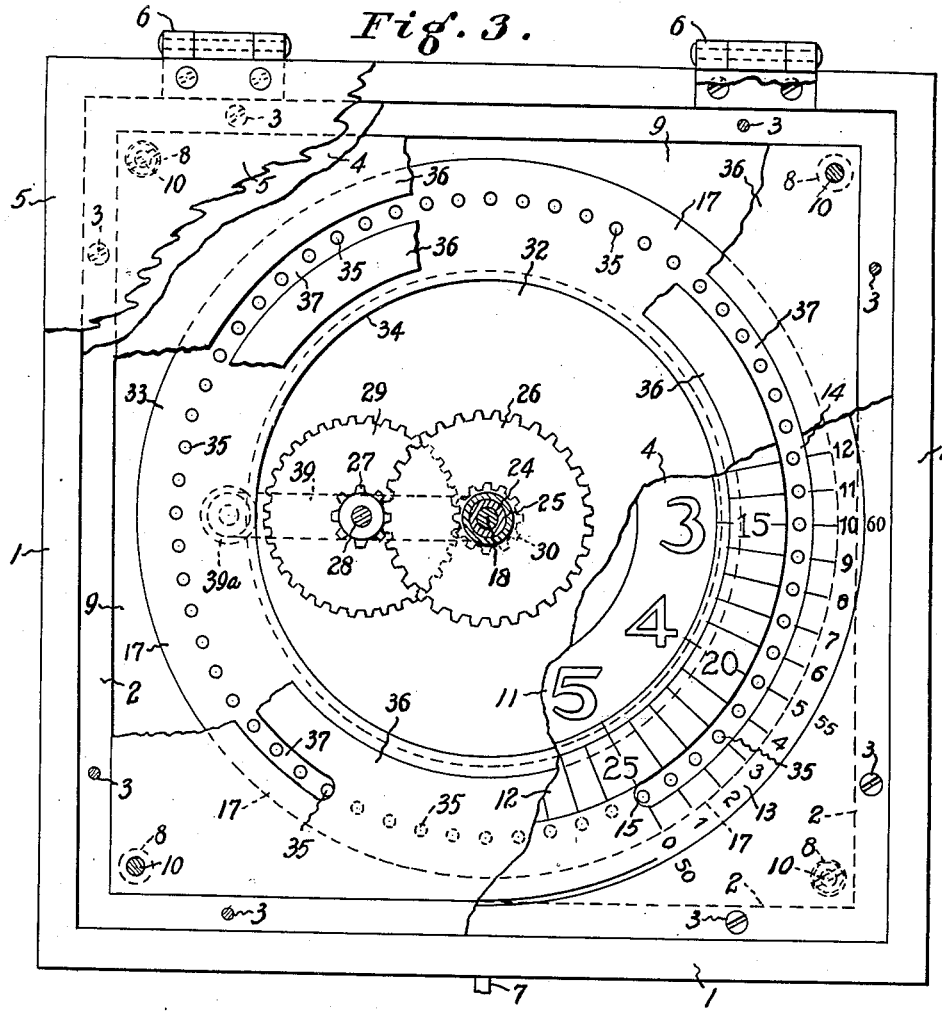
Fig. 3 is a plan view similar to Fig. 1 with certain parts broken away to reveal the interior mechanism.
Figure 4:
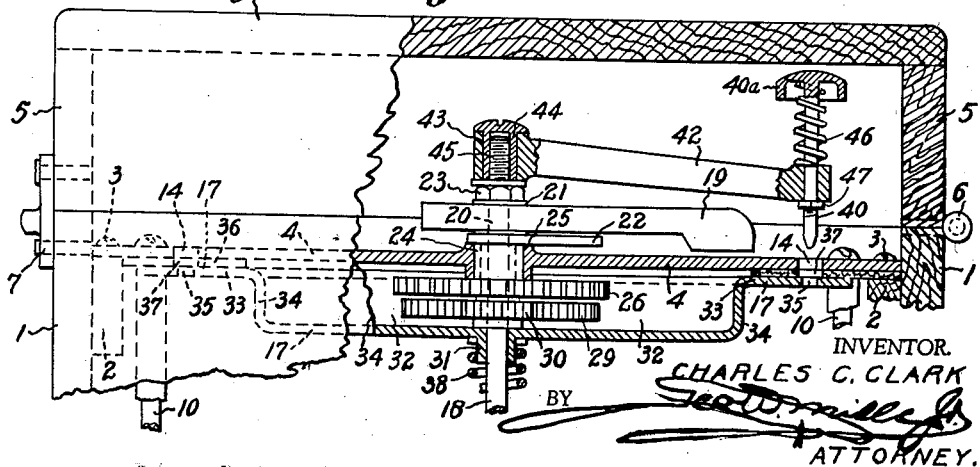
Fig. 4 is a vertical cross section on line 4—4 of Fig. 2 and showing film time dial operating style attached to the device.

Referring specifically to the drawings, in which like numerals are used to designate like parts, numeral 1 is a frame having ribs 2 disposed for attachment of the time schedule calculator device by means of nails or screws 3 projecting through some part such as the plate 4.

The plate may be of any conformation. In the instant case it is shown as rectangular and fits snugly between the walls of the frame. A cover or lid 5 may be advantageously hinged at 6 to the frame and secured in closed position by a catch 7 when the device is not being used.

Opposite the plate 4 and spaced therefrom a substantial distance by sleeves 8 is another plate 9, the plates being secured together by any number of bolts 10 projecting through the plates and the sleeves to clamp the plates between the bolts and the sleeves.

The spaced apart plates and the sides of the frame provide an enclosed chamber in which the operating mechanism and other hereinafter described parts are contained.

The center of the plate 4 has a clock face thereon with a circularly disposed hour scale 11 and a circularly disposed minute scale 12 concentric with the hour scale. There is also a dialing minute scale 13 substantially circularly disposed concentric with the hour and minute clock scales but with the numerals of the scale arranged in sequence counter-clockwise or reverse to the clock scale. The dialing minute scale is graduated in minutes and is within any designed minute range or ranges. In Fig. 1 there are two scales for fifty minutes each, with one from 0 to 50 and the other from 50 to 100; but there could be one or more, as desired, with different ranges for joint or individual use.

Between the clock minute and hour scales and the dialing minute scale, a circularly disposed slot 14 is provided in the plate. The slot is coextensive with the dialing minute scale and terminates therewith at points 15 and 16, these points serving as stops in the rotating of a dialing disc 17 hereinafter described.

A staff 18 is journalled on plates 4 and 9 and has mounted on the upper end a minute hand 19. This may be attached in any suitable manner. In the instant case, the end of the staff is slotted at 20 and the end of the minute hand fits therein and is secured between a washer 21 and the hour hand 22 by means of nut 23 bearing against the washer.

The hour hand is fitted to a sleeve 24 journalled between the staff 18 and the bearing socket 25 in the plate 4. The sleeve 24 has a gear 26 fixed thereon in position to mesh with pinion 27 on a stub shaft 28 that is secured to plate 4. Pinion 27 is integral with the larger gear 29 that is arranged to mesh with pinion 30. Pinion 30 is keyed to staff 18.

There is also keyed to staff 18 at hub 31 the above referred to dialing disc 17. The dial is a plate, preferably of light metal, depressed to form a chamber portion 32 and a flange portion 33 with a stepped portion 34 therebetween. The flanged portion is provided with spaced apart recesses 35 to correspond and register with dialing scale 13 on the plate 4.

Inasmuch as the plate 4 and the dialing disc 17 are usually of metal, a gasket 36 may be interposed and secured in position by the bolts which hold the plates 4 and 9 together. The gasket may be any suitable material such as cardboard, leather or the like, to separate the plates and deaden any metal sound that might result by the dialing disc. The gasket is slotted at 37 to conform and register with the slot 14 in plate 4. Except in the area of the slot, the gasket spaces and separates the flanged portion of the dialing disc from the plate 4.

A coiled spring 38 is disposed about the staff 18 and between the plate 9 and the dialing disc in order to press the disc, or the flanged portion thereon, against the gasket.

The bottom end of the staff 18 has a crank handle 39 fixed thereon in order that the staff may be quickly rotated to turn the clock hands to any desired time by means of knob 39a.

The dialing disc may be manipulated by a separate tool or stylus 40 having a pointed end 41 adapted to fit the recesses in the disc (Fig. 1) or by a tool or stylus 40 fitted to a selector arm 42. The arm can be secured to the staff 18 by having an end recessed at 43, through which a screw sleeve 44 is fitted to the recess and screwed to the end of the staff at 45. Where the stylus is fitted to a selector arm, the arm may bear against the nut 23 or the nut 23 could be omitted as it is adapted to serve the function of the nut. The stylus is normally held spaced from the dialing disc by a spring 46 inserted between the head 40a of the stylus and the arm 42. A nut 47 on the stylus serves as a stop and may be adjusted to tension of the spring.

In the operation of the device, turning the dialing disc by the crank handle revolves the staff to which the dialing disc and the gear 30 are fixed. Accordingly, the minute hand, which is fixed to the staff 18, is also turned. The hour hand is actuated at the same time by the gear mechanism, said gear mechanism being in proper ratio. Gears 26 and 27 are in a 1 to 4 ratio and gears 29 and 30 are in a 1 to 3 ratio, thereby making a 1 to 12 ratio between the hour and minute hands of the clock.

Were it desired to use the dialing minute scales and dialing disc of wider range selectively in wider or narrower ranges, the outer one could be from 0 to 100 and the inner one 0 to 50. All that would be necessary to change from the lower to higher scale would be merely to have a 1 to 2 ratio gear drive mechanism between shaft 18 and dialing disc 17 to make a total 1 to 24 ratio.

Having described my invention and one preferred embodiment for illustrating same, I claim:

1. A time schedule calculator for calculating time schedules comprising plates secured together in spaced-apart relation to provide a space therebetween, a clock dial provided on the exposed face of one of the plates having hour and minute scales, a shaft journalled on the plates and carrying an indicating means for one of the scales, a second indicating means for the other scale associated with the shaft, a movable dialing disc fixed to the shaft between the two plates and provided with selected portions in registration with the minute scale, gear reduction mechanism connecting the shaft and the second indicating means, and a slot provided in the plate having the clock dial thereon to give access to means for actuating the dialing disc.

2. A time schedule calculator for calculating time schedules comprising plates secured together in spaced-apart relation to provide a space therebetween, a clock dial provided on the exposed face of one of the plates having marked thereon minute and hour scales, a center shaft mounted on the plates, separate indicating means for each of the scales and one of said indicating means being mounted on the shaft, gear reduction mechanism connected to the shaft and the other indicating means, a dialing disc fixed to the shaft between the plates and provided with a row of separate recesses, each in registration with the minute scale of the clock dial, and a slot in the plate having the clock dial thereon through which means may be projected to actuate the dialing disc.

3. A time schedule calculator for calculating time schedules comprising plates secured together in spaced-apart relation to provide a space therebetween, a clock dial provided on the exposed face of one of the plates having marked thereon minute and hour scales, a center shaft mounted on the plates, separate indicating means for each of the scales and one of said indicating means being mounted on the shaft, gear reduction mechanism connected to the shaft and the other indicating means, a dialing disc fixed to the shaft having a central portion spaced from one of the plates in which to house the gear reduction mechanism between said disc and plate and also having a flange rim surrounding the central portion with selected portions thereon in registration with the minute scale, and a slot provided in the clock dial plate through which means may be projected to actuate the dialing disc.

4. A time schedule calculator for calculating time schedules comprising plates secured together in spaced-apart relation to provide a space therebetween, a clock dial provided on the exposed face of one of the plates having hour and minute scales, a shaft journalled on the plates and carrying an indicating means for one of the scales, a second indicating means for the other scale associated with the shaft, a movable dialing disc fixed to the shaft between the two plates and provided with selected portions in registration with the minute scale, gear reduction mechanism connecting the shaft and the second indicating means, a slot provided in the plate having the clock dial thereon to give access to means for actuating the dialing disc, and means for pressing the dialing disc towards the plate in which the slot is provided.

5. A time schedule calculator for calculating time schedules comprising plates secured together in spaced-apart relation to provide a space therebetween, a clock dial provided on the exposed face of one of the plates having hour and minute scales, a shaft journalled on the plates and carrying an indicating means for one of the scales, a second indicating means for the other scale associated with the shaft, a movable dialing disc fixed to the shaft between the two plates and provided with selected portions in registration with the minute scale, gear reduction mechanism connecting the shaft and the second indicating means, a slot provided in the plate having the clock dial thereon to give access to means for actuating the dialing disc, and a spring interposed between the dialing disc and the plate with the dial provided thereon for pressing said dialing disc against the plate on which the dial is provided.

6. A time schedule calculator for calculating time schedules comprising a plate adapted to be secured in position, a shaft journalled on the plate, and having indicating means cooperating with a clock dial provided on the face of the plate, a minute indicating scale arranged about and on the face of the plate provided with a clock dial, a disc fixedly mounted on the shaft and adjacent the back of the plate for rotating the shaft, selected portions provided on the disc in registration with the minute computing scale, gear mechanism connecting the indicating means and the shaft for movement in predetermined ratio and housed between the disc and the plate, and a slot provided in the plate to give access to the selected portion on the dialing disc for actuating said disc.

CHARLES C. CLARK.